UNITED STATES PATENT OFFICE.

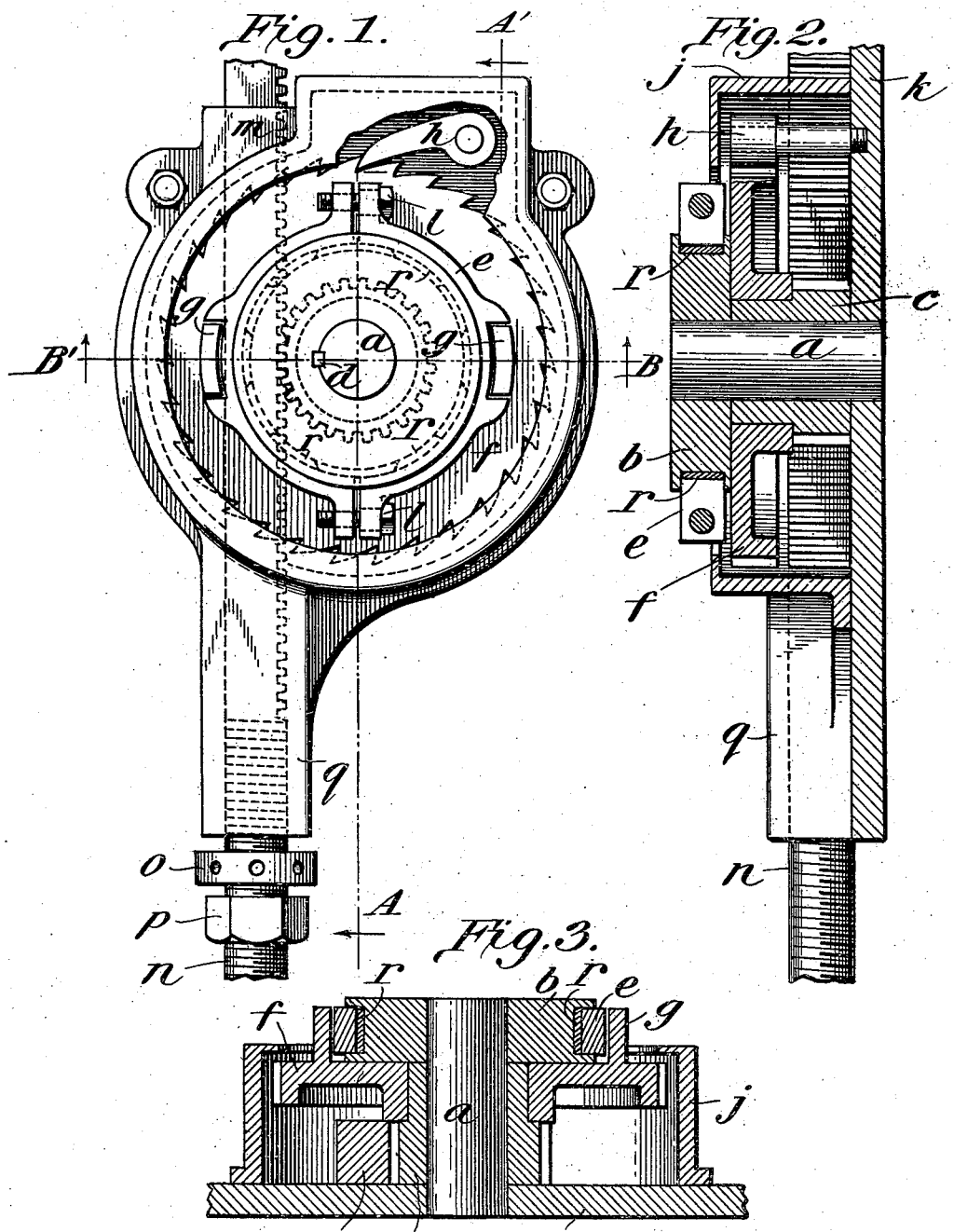

SETH H. LEAVENWORTH AND JAMES W. FARRELL, OF CINCINNATI, OHIO, ASSIGNORS TO HOMAN & COMPANY, OF CINCINNATI, OHIO.

DEVICE FOR REGULATING THE ROTARY MOTION OF A SHAFT.

No. 896,072.    Specification of Letters Patent.    Patented Aug. 11, 1908.

Application filed April 6, 1907. Serial No. 366,864.

*To all whom it may concern:*

Be it known that we, SETH H. LEAVENWORTH and JAMES W. FARRELL, citizens of the United States, residing at Cincinnati, in the county of Hamilton and State of Ohio, have invented new and useful Improvements in a Device for Regulating the Rotary Motion of a Shaft, of which the following is a specification.

Our invention relates to a device for governing the rotary motion of a shaft, and the objects of our invention are: First, to stop automatically, and after a predetermined number of turns, the rotary motion of a shaft. Second, to provide a resistance that will retard the rotation of a shaft.

This invention applies primarily to a shaft that is actuated by manual power, but can be used also on a shaft actuated by mechanical power. We attain these objects by the mechanism illustrated in the accompanying drawings.

This invention applies particularly to candle molding machines. A candle molding machine consists of vertically arranged tubes, set in an iron box mounted on legs. Into these tubes operate plungers by which the candles are ejected. The plungers rest upon a common follower which is raised by vertical racks engaging with a train of gears. This train of gears is operated by a shaft, and upon this shaft the mechanism covered by this specification is fixed. The safety brake prevents the follower upon which the ends of the plungers rest, from falling at such a rate of speed as to break the machine after the candles have been ejected from the tubes, and the follower is being let down. The rack and nut can be so set as to stop the follower at any desired point. This causes the heads of the plungers to stand at a corresponding point in the tubes, enabling the operator of the machine to cast candles shorter than the full length of the tubes.

Similar letters refer to similar parts throughout the several views.

Figure 1. is a plan view of the mechanism. Fig. 2. is a section on A A′. Fig. 3. is a section on the line B B′.

$a$ represents a shaft, the rotary motion of which it is desired to regulate.

$b$ is a drum secured on the shaft $a$. $c$ is a pinion also secured on the shaft $a$ by means of the key $d$.

$e$ is a brake band, carrying friction material, encompassing the drum $b$, and adjustable by means of the screws 1.

$f$ is a ratchet wheel, engaging with the brake band $e$ by means of the lugs $g\ g'$, and free to rotate on the collar of the pinion $c$.

$h$ is a pawl, pivoted on a housing $j$ and support $k$, engaging with the ratchet wheel $f$.

$m$ is a rack with a screw extension $n$, carrying adjustable and lock nuts $o$ and $p$.

$q$ is an extension of the housing $j$, which serves as a guide for the rack $m$, and the extremity acts as a stop with which the adjustable nut $o$ contacts after a predetermined amount of travel.

$r$, $r$, etc., are blocks of flexible friction material riveted to the brake band $e$.

When the shaft $a$ is rotated, the pawl $h$ engages with the ratchet wheel $f$, causing the drum $b$ to turn within the brake band $e$. A resistance, adjustable by the amount of tension of the brake band, is thus provided against the motion of the shaft. The adjustable nut $o$ and the lock nut $p$ are set at any desired point on the screw extension $n$ of the rack $m$, and by contact with the stop $q$ check the motion of the shaft $a$ after a predetermined number of rotations.

Having described our invention, we claim:

1. In a device of the kind described, the combination of a shaft; a drum secured to the shaft; a brake band encompassing said drum; a pawl; a ratchet wheel engaging with the brake band and free to rotate with the shaft in one direction, but prevented from rotation in the opposite direction by said pawl; and a pinion secured to the said shaft; a rack having a screw extension engaging said pinion; a stationary stop; a nut adapted to be moved up and down upon said extension, and to come into contact with said stationary stop, all substantially as specified.

2. In a device of the kind described, the combination of a shaft; a drum secured to the shaft; a brake band encompassing said drum; a pawl; a ratchet wheel engaging with brake band by means of lugs which enter into recesses in the brake band, said brake band being free to rotate with the shaft in one direction, but prevented from rotation in the opposite direction by said pawl; and a pinion secured to the said shaft; a rack having a screw extension engaging said pinion; a stationary stop; a nut adapted to be moved up and down upon said extension, and to come into contact with said stationary stop, all substantially as specified.

3. In a device of the kind described, the combination of a shaft; a drum secured to the shaft; a brake band encompassing said drum, the brake band composed of two semi-circular parts capable of being contracted or expanded by means of lugs carrying adjusting screws by which the tension of the brake band may be regulated; a pawl; a ratchet wheel engaging with the brake band by means of lugs entering into recesses in the brake band, said ratchet wheel being free to rotate with the shaft in one direction, but prevented from rotation in the opposite direction by said pawl; and a pinion secured to the said shaft; a rack having a screw extension engaging said pinion; a stationary stop; a nut adapted to be moved up and down upon said extension, and to come into contact with said stationary stop, all substantially as specified.

4. In a device of the kind described, the combination of a shaft; a drum secured to the shaft; a brake band encompassing the said drum, the brake band being composed of two semi-circular parts capable of being contracted or expanded by means of lugs carrying adjusting screws by which the tension of the brake band may be regulated, the brake band being fitted with insertions of friction material at intervals, constituting the friction surface contacting with the above mentioned drum; a pawl; a ratchet wheel engaging with the brake band, being free to rotate with the shaft in one direction, but prevented from rotation in the opposite direction by said pawl; and a pinion secured to the said shaft; a rack having a screw extension engaging said pinion; a stationary stop; a nut adapted to be moved up and down on said extension, and to come into contact with said stationary stop, all substantially as specified.

5. In a device of the kind described, the combination of a shaft; a drum secured to the shaft; a brake band encompassing the said drum; a pawl; a ratchet wheel engaging with the brake band, and free to rotate with the shaft in one direction, but prevented from rotation in the opposite direction by said pawl; and a pinion secured to the said shaft; a rack having a screw extension engaging said pinion; a stationary stop; a nut adapted to be moved up and down on said extension, and to come into contact with said stationary stop; a housing so constructed as to form a guide to confine the rack to a motion tangent to the circumference of the pinion, all substantially as specified.

6. In a device of the kind described, the combination of a shaft; a drum secured to the shaft; a brake band encompassing the said drum; a pawl; a ratchet wheel engaging with the brake band, and free to rotate with the shaft in one direction, but prevented from rotation in the opposite direction by said pawl; and a pinion secured to the said shaft; a rack having a screw extension engaging said pinion; a stationary stop; a nut adapted to be moved up and down on said extension, and to come into contact with the said stationary stop; a housing so constructed as to form a guide to confine the rack to a motion tangent to the circumference of the pinion; the said guide being provided with a shoulder constituting a stop, with which the adjusting nut on the screw extension of the rack contacts after the shaft has made a predetermined number of turns, all substantially a specified.

In testimony whereof we have signed our names to this specification in the presence of two subscribing witnesses.

SETH H. LEAVENWORTH.
JAMES W. FARRELL.

Witnesses:
THOMAS A. MACKLIN,
JOHN A. HOSTY.